United States Patent [19]
Koike et al.

[11] Patent Number: 5,787,949
[45] Date of Patent: Aug. 4, 1998

[54] METHOD OF CONTROLLING FEED IN A SPINDLELESS VENEER LATHE AND APPARATUS TO WHICH THE METHOD IS APPLIED

[75] Inventors: Masaru Koike; Takashi Nakaya, both of Ohbu, Japan

[73] Assignee: Meinan Machinery Works, Inc., Aichi-ken, Japan

[21] Appl. No.: 674,785

[22] Filed: Jul. 3, 1996

[30] Foreign Application Priority Data

Jul. 7, 1995 [JP] Japan .................. 7-172488

[51] Int. Cl.$^6$ .................................................. B27B 1/00
[52] U.S. Cl. .......................... 144/357; 144/213; 144/365
[58] Field of Search ............... 194/209.1, 211, 194/213, 212, 357, 365, 356; 364/474.04, 474.09, 474.17

[56] References Cited

U.S. PATENT DOCUMENTS

| | | | |
|---|---|---|---|
| 4,073,326 | 2/1978 | Pank et al. | 144/213 |
| 4,901,777 | 2/1990 | Koike | 144/365 |
| 4,922,979 | 5/1990 | Crabtree et al. | 144/365 |
| 5,141,038 | 8/1992 | Nakaya | 144/213 |
| 5,333,658 | 8/1994 | Albion et al. | 144/213 |
| 5,452,220 | 9/1995 | Ely | 144/213 |
| 5,490,548 | 2/1996 | Puranen | 144/213 |
| 5,564,253 | 10/1996 | Nakaya | 144/365 |

FOREIGN PATENT DOCUMENTS 465201  6/1992  Japan .................. B27L 5/02

*Primary Examiner*—W. Donald Bray
*Attorney, Agent, or Firm*—Pearson & Pearson

[57] ABSTRACT

A method of controlling the clearance angle of a veneer knife in a veneer lathe under a spindleless condition is applied to a veneer lathe that includes the veneer knife, at least three rollers, feed mechanisms coupled to at least two of the rollers for feeding the rollers, and a drive system coupled to at least one of the rollers for rotatably driving thereof, wherein the rollers to which the drive system is coupled supplies all the driving force required for rotating the log while each roller to which the feed mechanism is coupled are fed to hold the log while the log is peeled by the veneer knife. The method comprises the steps of setting a shifting amount based on a predetermined reduction in the diameter of the log from a predetermined first diameter to a predetermined second diameter and automatically shifting the rotational axis of the log in the direction perpendicular to the plane extending between the rotational axis of the log and the cutting edge of the veneer knife by the shifting amount during veneer peeling.

13 Claims, 11 Drawing Sheets

METHOD OF CONTROLLING FEED IN A SPINDLELESS VENEER LATHE AND APPARATUS TO WHICH THE METHOD IS APPLIED

BACKGROUND OF THE INVENTION

1. Field of the Invention

The present invention relates to a spindleless or centerless veneer lathe. More particularly, the present invention relates to a method of peeling veneers under a spindleless or centerless condition while controlling the position of the rotational axis of a log and to a spindleless veneer lathe to which this method is applied.

2. Description of the Prior Art

Generally, a spindleless veneer lathe employs either one of the following methods of peeling veneers from a log under a centerless or spindleless condition. By one method, spindles for holding the log at the axial ends are disengaged and moved away from the log at a convenient time in the process of veneer peeling operation, so that the torque required for the peeling operation is provided solely by a peripheral drive system when spindles are not used. By the other method, the lathe is not provided with spindles at all, so that the torque required for peeling veneers is solely provided by a peripheral drive system from the beginning of peeling operation. Spindleless veneer lathes, whichever method they may employ, provide the advantage of being able to peel logs down to very small diameters since spindles are either moved away from the rotational axis of the logs or not used at all.

FIG. 1 shows the position of a log 1 with respect to a veneer knife 15 and a peripheral drive system 20 in a spindleless veneer lathe during veneer peeling. The peripheral drive system 20 comprises peripheral drive rollers 3 disposed at axially spaced intervals on a common drive shaft 3a. Each roller 3 has a number of spikes 3a which are arranged on the peripheral surface thereof to be engageable with the peripheral surface of the log 1. The peripheral drive system 20 further comprises horizontal pressure rollers 21 and a vertical pressure roller 31 for both preventing the log 1 from bowing by force applied thereto and for stably holding the log 1 during peeling. At least three sets of rollers are required to support a rotating log in a stable manner; for instance, four rollers may be radially arranged at right angles from the rotational axis A of the log 1 around the peripheral surface of the log 1.

The three sets of rollers are controlled to have the same feed rate so that the rotational axis A of the log 1 may be maintained at the same position during peeling operation as with the spindle-assisted veneer peeling method. If, for example, the thickness of a peeled veneer 4 is to be 4 mm, a feed mechanism 18 is to continuously feed the peripheral drive rollers 3 at the rate of 4 mm toward the rotational axis A of the log 1 for each rotation of the log 1 based on the measurement by a rotational angle detector. Similarly, the horizontal and vertical pressure rollers 21 and 31 are also fed at the same rate toward the rotational axis A of the log 1 in a continuous manner for each rotation of the log 1.

Unlike the above method, in which the rotational axis A of the log 1 is held in a stationary position with the three rollers fed toward the center A, some other feeding method may be employed. For example, the peripheral drive rollers 3 may be stationary while the vertical pressure rollers 21 are fed at the rate based on the thickness of the veneer 4 be peeled and the horizontal pressure roller 31 fed at twice as fast a rate, which eliminates the necessity of moving the heavy tool post. In this case, however, the vertical pressure rollers 21 need to be moved horizontally as well at the same time.

Referring to FIG. 2, a spiral L represents the path along which the edge of a veneer knife 15 moves on the cross section of the log 1 as the peeling operation proceeds. Theta 0 is the apparent angle of relief of the veneer knife 15 formed between a relief 15a of the veneer knife 15 and the vertical line from the point where the cutting edge is in contact with the peripheral surface of the log 1.

On the other hand, the angle formed between the relief 15a and the tangent to the spiral L from the cutting edge is called the clearance angle, such as theta 1 or 2.

The clearance angle changes as the direction of the tangent to the spiral L changes during the process of peeling operation. FIG. 3 shows typical clearance angle curves over the diameter reduction of the log. The curve marked with circles represents the change in the clearance angle when the cutting edge is positioned below the rotational axis of the log while the curve marked with circles represents the change in the clearance angle when the cutting edge is positioned above the rotational axis. It is readily understood from the first curve that when the cutting edge is below the rotational axis of the log, the clearance angle remains approximately the same level until the diameter approaches the minimum peelable diameter of 200 mm, at which the clearance angle steeply increases.

With the increase of the clearance angle of the veneer knife 15 to the peripheral surface of the log 1, the veneer knife 15 may vibrate or chatter against the log surface, so that the peeled veneer may have roughened surface or cracks on the back, resulting in uneven thickness or general poor quality of the peeled veneer. In particular, the surface of the veneer becomes increasingly more roughened toward the end of the peeling operation since the clearance angle rapidly increases as the log is peeled down close to its minimum peelable diameter as shown in FIG. 3.

Different methods have been practiced to maintain the clearance angle at approximately the same over the range of the diameter of the log as explained hereinafter.

FIG. 4 shows a central sectional side view of a known cutting angle adjusting apparatus for controlling the angle of the veneer knife 15 so as to maintain the clearance angle at approximately the same while the diameter of the log decreases. Although shown here as applied to a spindle-driven veneer lathe, the cutting angle adjusting apparatus may also be applicable to a spindleless veneer lathe.

More particularly, the apparatus includes a bed 111, a pair of frames 112 attached to the sides thereof, and a pair of guide rails 113 provided on the frames 112. The guide rails 113 support a tool post 114 on its left and right sides and also function as guides therefor when the tool post 114 is moved horizontally by the rotation of a feed screws 115. The tool post 114 in turn includes a knife carriage 116 and a tool post support 117. The knife carriage 116 has at either side a pair of semicircular slide members 118 (only one being shown) which are freely rotatably fit in a pair of semicircular holders 119 (only one being shown) of the tool post support 117. The rotational axis of the semicircular slide members 118 is located on the cutting edge of the veneer knife 15 and on the same horizontal plane as the rotational axis of spindles 120 (only one being shown) is on.

The knife carriage 116 has at its bottom a plurality of rollers 121 (only one being shown) which are supported by respective slopes 122 which regulates the rotation of the knife carriage 116. One end of each slope 122 is supported by a pivot 124 while the other end is supported by a lifting member 123 that can be lifted and lowered by a slope angle adjusting mechanism (not shown) as indicated by the double-headed arrow in FIG. 4. This construction allows the angle of the slopes 122 to be easily adjusted by lifting or lowering the slope 122.

In normal peeling operation, the left ends of the slopes 122 are lowered by moving the lifting members 123 downward to rotate the knife carriage 116 on the rotational axis along the edge of the knife 15, so that the clearance angle of the veneer knife 15 can be kept the same while maintaining the cutting edge at the same height.

Referring again to FIG. 2, the cutting edge of the veneer knife 15 is shown in a position much lower than in normal peeling operation for the sake of explanation. If the cutting edge is positioned t/2 pi (t=veneer thickness) lower than the horizontal plane on which the rotational axis A of the log lies, the clearance angle remains the same throughout veneer peeling because the tangent to spiral L from the cutting edge coincides with the vertical line from the cutting edge. (The position of the cutting edge t/2 pi lower than the horizontal plane on which the rotational axis A of the log lies will be referred to as the reference cutting edge position hereinafter.)

When the cutting edge is above the rotational axis A of the log, however, the clearance angle remains approximately the same for a while until it starts to decreases gradually as the peeling operation proceeds. Then, as the diameter approaches the minimum peelable diameter, so the clearance angle rapidly decreases as shown in the clearance angle curve marked with triangles as shown in FIG. 3.

As mentioned before, a method based on this geometric theorem has been practiced for controlling the clearance angle. By this method, the cutting edge is held in the reference cutting edge position throughout the peeling operation, maintaining the same clearance angle over the reduction in the log diameter. This method has been also applied to spindleless veneer lathes because such a change in the clearance angle occurs in a spindleless veneer lathes as well.

The above-described two techniques, however, have the following problems and disadvantages.

First, the cutting angle adjusting apparatus shown in FIG. 4 is structurally complicated, comprising a number of parts, including some that need to be manufactured with high precision so that the veneer knife 15 is pivotal on the cutting edge. For instance, it is no easy task to manufacture the semicircular slide members 118 and the semicircular holders 119 with sufficient precision to rotatably fit the former members in the latter members. Moreover, the slidable interfaces between these members 118 and 119 need proper lubrication; otherwise rust may develop on the interfaces, which hampers the control of the rotation of each semicircular slide member 118.

As the apparatus is composed of numerous members, relatively small manufacturing tolerance in each member may add up to a significant tolerance upon assembly. As a result, the right and left slopes 122 may not have the same angle or height, for example.

The problem of being composed of many parts often reduces the mechanical strength of the apparatus or causes backlash between parts and reduced mechanical precision.

When the cutting edge is maintained in a fixed height, the pattern of change in the clearance angle in the process of peeling varies according to the thickness of the veneer as explained above. Therefore, even if the cutting angle adjusting apparatus is employed, difficult adjustments are still necessary to maintain the same clearance angle every time the thickness of the veneer is changed.

Even with these inherent disadvantages, this type of apparatus has been used to date in the absence of a better alternative.

By the second method, in which the cutting edge of the knife 15 is held in the reference cutting edge position, the clearance angle employing a complicated apparatus such as the cutting angle adjusting apparatus. Other problems, however, arise with this method.

Even if the clearance angle remains the same, the contact area between the relief 15a of the veneer knife 15 and the peripheral surface of the log 1 decreases as the diameter of the log 1 is reduced by peeling. The cutting edge tends to cut deeper into the log when the contact area is small. This causes the peeled veneer to have a roughened surface or uneven thickness.

Furthermore, since it is a common practice to use one veneer lathe to peel veneers of different thickness, this method necessitates changing the reference cutting edge position according to the selected veneer thickness.

In the type of spindleless veneer lathe as shown in FIG. 1, the peripheral drive system equipped with spikes solely provides all the torque required for peeling. If the rotational axis A of the log 1 and the common drive shaft 3a remain on the same respective horizontal planes throughout the peeling operation, the spikes 3b incise the log 1 less deeply as the peeling proceeds, which in turn results in insufficient torque transmitted for veneer peeling.

The conventional spindleless veneer lathe of FIG. 1 attempts to solve this problem by having a pressure member 9 press the peripheral drive rollers 3 against the log 1. Toward the end of peeling, when the log 1 is peeled down close to a minimum peelable diameter, however, the incision of the spikes 3b into the log 1 may still become insufficient, so that freshly peeled veneer may be stuck adjacent to the cutting edge. If this occurs, the stuck peel must be removed before resuming operation, thereby reducing the operating efficiency.

SUMMARY OF THE INVENTION

The object of the present invention is thus to produce high quality veneers by controlling the clearance angle of the veneer knife with a simply structured mechanism.

The above and other related objects are realized by a method of controlling the clearance angle of a veneer knife in a veneer lathe under a spindleless condition. The veneer lathe comprise a veneer knife for peeling veneers, not less than three rollers, feed mechanisms coupled to not less than two of the rollers for feeding thereof, and not less than one drive system coupled to not less than one of the roller for rotatably feeding thereof, wherein each roller to which one of the drive systems is coupled supplies all the driving force required for rotating the log while each roller to which one of the feed mechanisms is coupled are fed to peel the log with the veneer knife while the log is held by all the rollers. The method includes the steps of setting a shifting amount based on the reduction in the diameter of the log from a predetermined first diameter to a predetermined second diameter, and automatically shifting the rotational axis of the log during veneer peeling in the direction perpendicular to the plane extending between the rotational axis of the log and the cutting edge of the veneer knife by the shifting amount, thereby controlling the clearance angle of the veneer knife during veneer peeling.

The method automatically shifts the rotational axis of the log in a vertical direction based on the reduction in the diameter of the log from a first diameter and a second diameter. The clearance angle of the veneer knife is automatically maintained at the same degree during veneer peeling, resulting in a higher quality of peeled veneers.

In accordance with one preferable application, the shifting amount based on the reduction in the diameter of the log is set at least before the cutting edge of the veneer knife reaches the first diameter.

In accordance with another preferable mode, the first diameter of the log is approximately 140 mm and the second diameter of the log is approximately 40 mm.

According to still another preferable mode, the rotational axis of the log is automatically shifted during veneer peeling in the direction perpendicular to the plane extending between the rotational axis of the log and the cutting edge of the veneer knife by changing the feed rates of all the rollers except those fed by the feed mechanism in the direction along the plane extending between the rotational axis of the log and the cutting edge of the veneer knife, thereby controlling the clearance angle of the veneer knife during veneer peeling.

Preferably, the rollers comprises a peripheral drive roller provided above the veneer knife, a horizontal pressure roller movable in a horizontal direction, and a vertical pressure roller movable in a vertical direction, whereby the clearance angle of the veneer knife is controlled during veneer peeling by feeding the vertical pressure roller.

Preferably, each roller is divided into cylindrical sections disposed along the axis thereof.

Furthermore, the shifting amount preferably is so set that the clearance angle of the veneer knife is maintained at approximately the same degree.

Moreover, the shifting amount preferably is corrected after the setting so as to change the clearance angle of the veneer knife.

The correction of the shifting amount is preferably made before a minimum peelable diameter of the log is reached when the veneer peeling is being completed such that the rotational axis of the log is shifted in the direction opposite to the previous shifting direction so as to change the clearance angle of the veneer knife.

Preferably, the shifting amount is set according to the thickness of the veneer to be peeled.

The present invention is also directed to a veneer lathe for peeling veneer from a log under a spindleless condition comprising not less than three rollers, feed mechanisms coupled to not less than two of the rollers for feeding thereof, not less than one drive system coupled to not less than one of the rollers for rotatably feeding thereof, and a control unit for controlling the operation of the lathe so that each of the rollers to which one of the drive systems is coupled supplies all the driving force required for rotating the log while each roller to which one of the feed mechanisms is coupled is fed to peel the log by the veneer knife while the log is held by all the rollers. The veneer lathe further comprises a correcting unit for correcting the operation of the control unit so that the rotational axis of the log is automatically shifted during veneer peeling in the direction perpendicular to the plane extending between the rotational axis of the log and the cutting edge of the veneer knife by a shifting amount set based on the reduction in the diameter of the log from a predetermined first diameter to a predetermined second diameter, thereby controlling the clearance angle.

In this veneer lathe, the correcting unit corrects the operation of the control unit so that the rotational axis of the log is automatically shifted during veneer peeling in the direction perpendicular to the plane extending between the rotational axis of the log and the cutting edge of the veneer knife by a shifting amount set based on the reduction in the diameter of the log from a predetermined first diameter to a predetermined second diameter. This structure allows the clearance angle of the veneer knife to be controlled during the veneer peeling, with an improved quality in peeled veneers especially toward the end of the peeling operation.

In a preferred mode, the rollers comprise a peripheral drive roller provided above the veneer knife, a horizontal pressure roller movable in a horizontal direction, and a vertical pressure roller movable in a vertical direction.

Also, the correction unit preferably makes correction so as to move the vertical pressure roller in a vertical direction so as to change the clearance angle of the veneer knife.

DETAILED DESCRIPTION OF THE PREFERRED EMBODIMENTS

The present invention will be more particularly described with reference to the accompanying drawings.

The three embodiments that will be explained hereinafter have the identical basic structure for peeling veneers under a centerless or spindleless condition, in which spindles are moved away from the log at a convenient time in the process of veneer peeling, so that the torque required for the peeling operation is provided by a peripheral drive system only.

Embodiment 1

Figure 6:
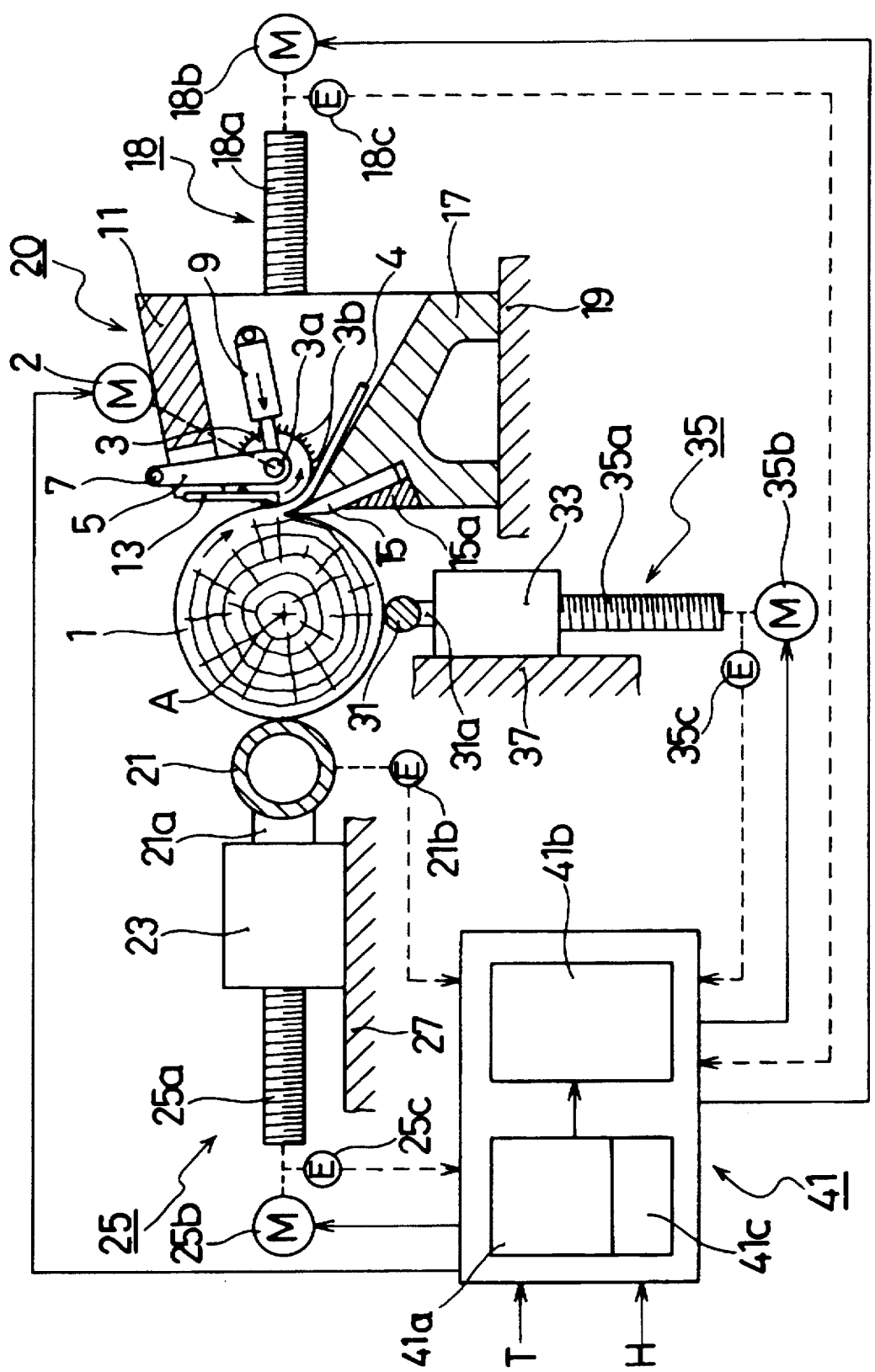
FIG. 6 is a side view schematically illustrating a spindleless veneer lathe to which a relief angle control method is applied as a first embodiment of the present invention.

Referring to FIG. 6, reference numeral 1 generally designates a log from which a veneer 4 is peeled. Reference numeral 3 is a plurality of sectional peripheral drive rollers disposed at axially spaced intervals on a common drive shaft 3a. Each drive roller 3 has a number of spikes 3b which are arranged on the periphery thereof to be engageable with the peripheral surface of the log 1. The drive shaft 3a receives from a peripheral drive motor 2 mounted on a support block 11 the driving force required for veneer peeling at least under the spindleless condition. A constant-speed-drive, three-phase induction motor will suffice for the peripheral drive motor 2.

The drive shaft 3a is supported by pivotal arms 5 (only one being shown) attached to a pivot 7 located above the peripheral drive rollers 3 such that the peripheral drive rollers 3 is pivotal on the pivot 7. During veneer peeling, the peripheral drive rollers 3 are constantly pressed by a pressure member 9 against the log 1 so that the peripheral drive rollers 3 can be displaced toward the log 1 while the diameter of the log 1 decreases as the peeling operation proceeds. Accordingly, the spikes 3b are constantly engaged with the peripheral surface of the log 1, ensuring that the torque required for veneer peeling is transmitted to the log 1.

There is indicated at 15 a veneer knife fasten to a knife carriage 17 with a knife wedge 15a. Regardless of the thickness of the peeled veneer 4, the cutting edge of the veneer knife 15 is permanently positioned 1 mm below the rotational axis A of the log 1 as the reference height for displacing the vertical position of the rotational axis A as will be explained in detail hereinafter.

Reference numeral 13 designates a plurality of pressure bars secured to the support block 11. Each pressure bar 13 is positioned between any two adjacent drive rollers 3 on the drive shaft 2c with its lower end positioned slightly above, and on the veneer conveying side of, the cutting edge of the veneer knife 15 for applying pressure to the log 1 adjacent to the position where the cutting edge of the veneer knife 15 is engaged with the log 1. The pressure bars 13 effectively prevent the veneer 4 from being split in the process of peeling.

Reference numeral 18 designates a feed mechanism that includes a plurality of rotatable feed screws 18a (only one being shown), such as ball threads, a feed-screw motor 18b, such as a servomotor, and a position detector 18c, such as a rotary encoder. The pair of rotatable feed screws 1a are engaged with the tool post 20 having the veneer knife 15 carried thereon. The feed-screw motor 18b, under the control of a control unit 41 (to be explained in detail hereinafter), rotates the rotatable feed screws 18a to cause the tool post 20 to reciprocate along a predetermined path at a desired feed rate, thereby peeling veneer with a predetermined thickness.

The support block 11 is provided with a lifting cylinder (not shown) for lifting open one end of its top cover to allow inspection and maintenance.

Designated at numeral 21 is a plurality of freely rotatable, sectional horizontal pressure rollers provided on a support frame 23 via a bearing box 21a. The rotational axis of the horizontal pressure rollers 21 lies approximately diametrically opposite to that of the peripheral drive rollers 3 across the log 1 on the same plane as the rotational axis A.

The pressure rollers 21 are brought into contact with the peripheral surface of the log 1 to prevent the log 1 from being bent in a horizontal direction.

Reference numeral 21b denotes a rotational angle detector, such as a rotary encoder, for measuring rotational angles of the log 1 and sending data representative of the measurements to the control unit 41. The support frame 23 is mounted on the slide surface 27 and allowed to reciprocate along a predetermined path in horizontal a direction by a shifting mechanism 25.

The shifting mechanism 25 includes a plurality of rotatable lead screws 25a, such as ball threads, a lead screw feeding motor 25b, such as a servomotor, a position detector 25c, such as a rotary encoder. One end of the lead screws 25a is connected to the support frame 23 via a bearing box (not shown). The feeding motor 25b operates under the control of the control unit 41 to feed the lead screws 25a at a predetermined rate so that the pressure rollers 21 can stay engaged with the peripheral surface of the log 1 as the diameter of the log 1 decreases in the process of peeling. The shifting mechanism 25 can also cause the horizontal pressure rollers 21 to reciprocate at a desired rapid traverse rate.

Designated at numeral 31 is a plurality of freely rotatable, sectional vertical pressure rollers provided on a support frame 33 via a bearing box 31a. The rotational axis of the pressure rollers 31 lies on the same vertical plane as the rotational axis A. The vertical pressure rollers 31 are brought into contact with the peripheral surface of the log 1 to prevent the log 1 from being bent in a vertical direction by its own weight. The support frame 33 is mounted on the slide surface 37 and allowed to reciprocate along a predetermined path in a vertical direction by a lifting mechanism 35.

The most of the force the vertical pressure rollers 31 receives during peeling operation is considered to be the weight of the log 1; the upward cutting resistance exerted for peeling the veneer 4 balances out the downward driving force or torque imparted to the log 1 by the spikes 3b on the peripheral drive rollers 3. As for the horizontal force applied to the log 1, the pressure force exerted by the pressure bars 13 and the relief of the veneer knife is on the log 1 is balanced with the pressure force exerted by the horizontal pressure rollers 21.

Since the force or the weight of the log 1 received by the pressure rollers 31 decreases as the peeling operation proceeds, the vertical pressure rollers 31 do not have to be as structurally strong as the horizontal pressure rollers 21; the diameter of the vertical pressure rollers 31 may be smaller than that of the horizontal pressure rollers 21, thereby contributing to the miniaturization of the entire apparatus.

The lifting mechanism 35 includes a plurality of rotatable lead screws 35a, such as ball threads, a lead screw feeding motor 35b, such as a servomotor, a position detector 35c, such as a rotary encoder. One end of the lead screws 35a is connected to the support frame 33 via a bearing box (not shown). The feeding motor 35 operates under the control of the control unit 41 to feed the lead screws 35a at a predetermined rate so that the pressure rollers 31 can stay engaged with the peripheral surface of the log 1 as the diameter of the log 1 decreases in the process of peeling. The shifting mechanism 35 can also cause the pressure rollers 31 to reciprocate at a desired rapid traverse rate.

It is understood from the foregoing explanation that the rollers 3, 21, and 31, and the feed mechanism 18 constitutes a peripheral drive system for holding and driving the log 1 from its periphery.

The control unit 41 includes a controller 41c, a compensator 41c, and a driving signal transmitter 41b for controlling the operation of the above-described motors 2, 18b, 25b, and 35b with a preinstalled program. The control unit 41 is constructed as a microcomputer including a CPU (central processing unit) a ROM, (read only memory), and a RAM (random access memory) although these elements are not shown in the drawing. The controller 41c receives output signals from the detectors 18c, 21c, 25c, and 35c and a veneer thickness set value T (to be explained in detail hereinafter) as its input signals and manipulates the received data with the preinstalled program. The compensator 41c compensates or corrects the result of the manipulation for an axis displacement set value H (to be explained in detail hereinafter) entered to shift the vertical position of the rotational axis A of the log 1. The driving signal transmitter 41b transmits to the motors 2, 18b, 25b, and 35b the driving signals calculated by the controller 41a after the manipulation and the compensation.

Each of the motors 2, 18b, 25b, and 35b may be controlled independently during preparation before or after veneer peeling by means of manual or semiautomatic operation; however, the computer program stored in the control unit 4 controls the operation of all these motors 2, 18b, 25b, and 35b in a conjunctive manner during veneer peeling as follows.

Prior to the veneer peeling operation, the log 1 having an irregular peripheral surface is held between a pair of spindles (not shown) and driven by respective spindle motors (not shown) to rotate idly with the spindles. At the same time, the tool post 20 is moved toward the log by the feed mechanism 18 at a desired rapid traverse rate until the veneer knife 15 mounted on the tool post 20 is brought into contact and cutting engagement with the periphery of the rotating log 1. While the tool post 20 is moved toward the log 1, the rotational speed of the spindle motor and the rapid traverse rate of the feed mechanism 18 may be set arbitrarily by means of manual or semiautomatic operation. However, at least upon cutting engagement of the veneer knife 13 with the periphery of the rotating log 1, the rotational speed of the spindles is controlled to correspond to or follow the driving speed of the peripheral drive rollers 3 while the feed rate effected by the feed mechanism 18 is also controlled to correspond to the rotational speed of the spindles calculated based on the information obtained by a rotational angle detector (not shown).

At any convenient time during the veneer peeling operation and before the spindles are disengaged and retracted away from the log 1 to place the veneer lathe in a spindleless condition, for example, at a time immediately after the log 1 has been rounded to become substantially cylindrical, the control unit 41 activates the motors 25b and 35b of the shifting mechanism 25 and the lifting mechanism 35, respectively, to move the pressure rollers 21 and 31 via the support frames 14 and 15 at any desired rapid traverse rate until the pressure rollers 21 and 31 are brought into contact and engagement with the periphery of the log 1. Upon engagement, the pressure rollers 21 and 31 are fed toward the rotational axis of the log 1 at the same rate as the feed rate of the tool post 20 driven by the feed mechanism 18. This allows the log 1 to be securely held by the spindles and the peripheral drive system while peeling veneer from the rotating log 1.

At any suitable time after the engagement of the pressure rollers 21 and 31 with the periphery of the log 1, the spindles are moved away from the axial ends of the log 1, placing the veneer lathe in a spindleless condition and leaving the log 1 rotated by the peripheral drive system alone.

During the veneer peeling after the retraction of the spindles, the control unit 41 also controls the feed rate of the tool post 20 driven by the feed mechanism 18 to correspond to the rotational speed of the log 1 calculated based on information obtained by the rotational angle detector 21b. At the same time, the pressure rollers 21 and 31 are also moved to correspond to the rotational speed of the log 1 by the control unit 41. As a result, the diameter of the log 1 is reduced by the thickness (t mm) of the veneer 4 for each rotation of the log 1; therefore, the feed rate of the feed mechanism 18 and the pressure rollers 21 and 31 must be t mm/rotation.

The part of operation according to the program so far explained is substantially the same as a known method of peeling veneers.

Figure 5:
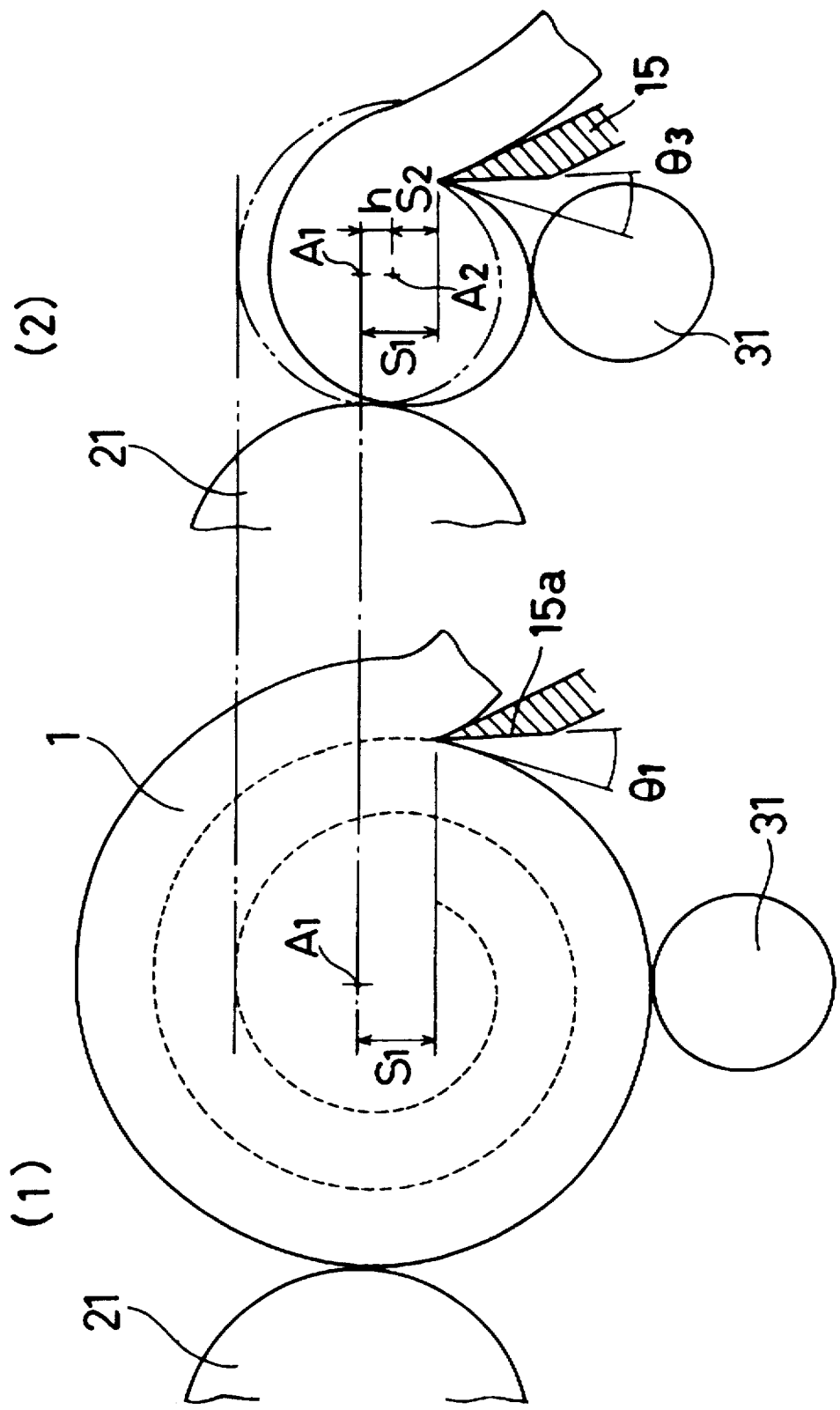
FIG. 5 is a sectional side view illustrating the positions of a log, a veneer knife, and rollers before and after starting a rotational axis positioning control according to the present invention.

This invention differs from known methods in gradually shifting the rotational axis A of the log 1 from coordinates A1 to coordinates A2 as shown in FIGS. 5A and 5B, thereby displacing the original coordinates A1 by distance h corresponding to the above-described displacement set value H. This operation is referred to as the rotational axis positioning control hereinafter. The control unit 41 is programmed to terminate the rotational axis positioning control when the log 1 is peeled down to a minimum peelable diameter.

As a result of this rotational axis positioning control, the vertical distance between the rotational axis A and the cutting edge of the veneer knife 15 is changed height from S1 to height S2.

Figure 1:
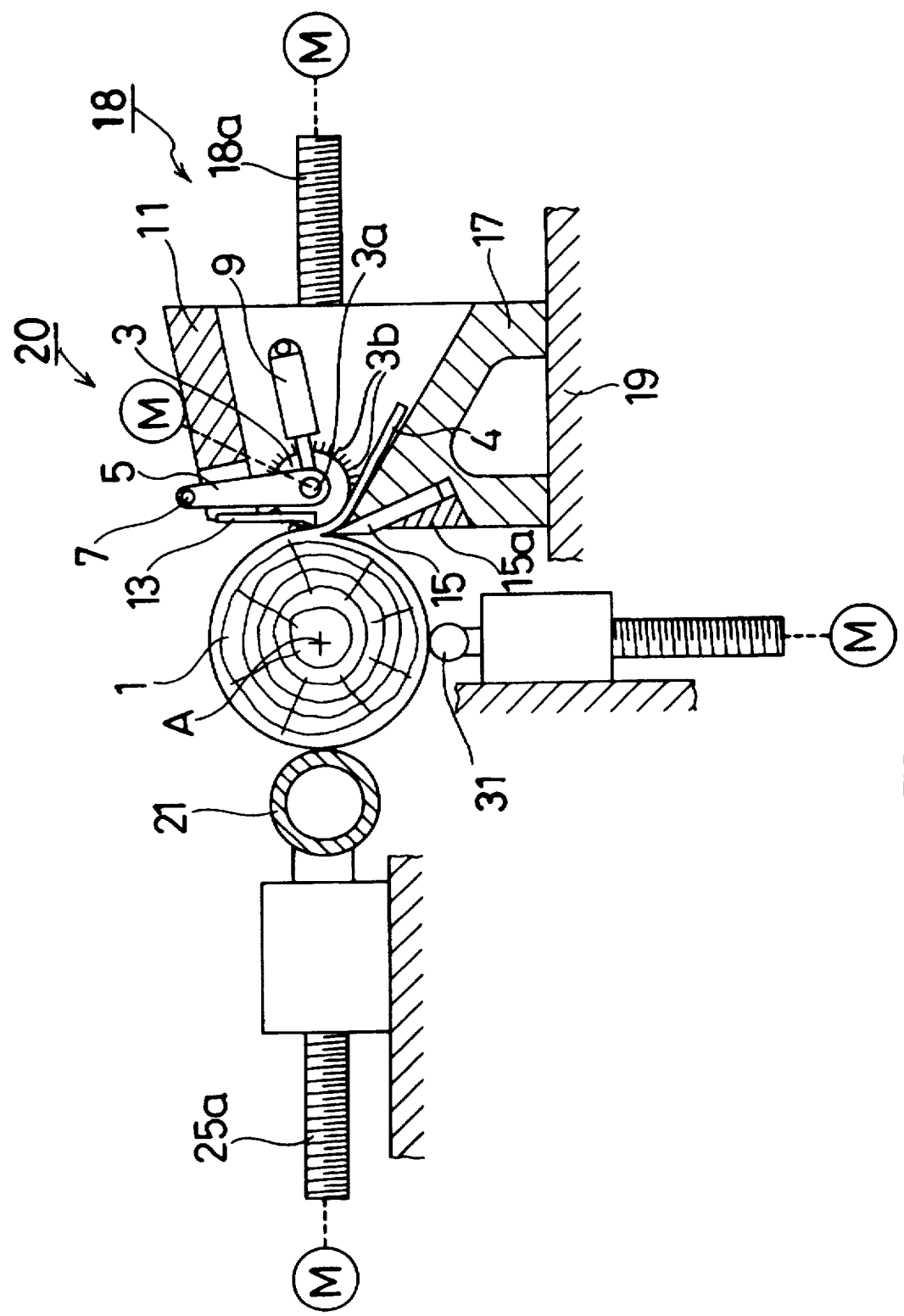
FIG. 1 is a side view schematically illustrating the positions of a veneer knife, a log, and a peripheral drive system according to a known spindleless veneer lathe.
Figure 2:
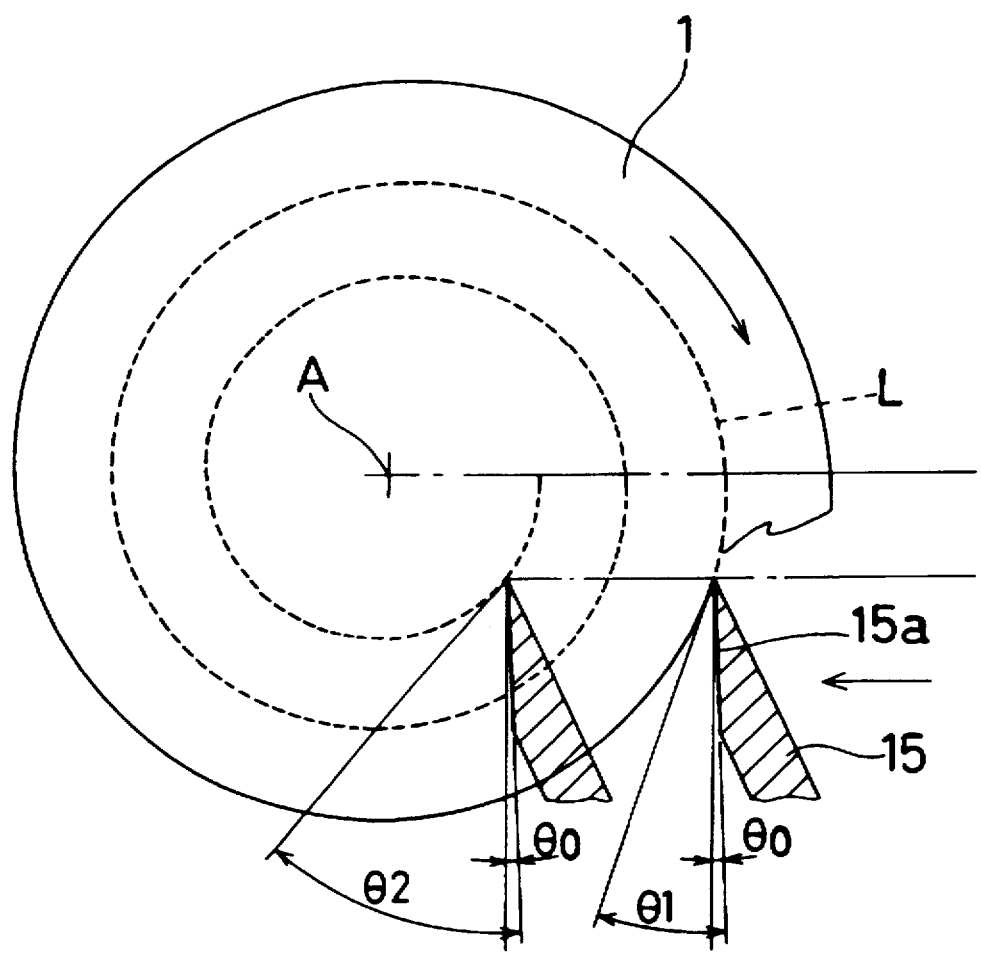
FIG. 2 shows a spiral L that represents the path along which the cutting edge moves on the cross section of the log in the process of peeling operation.

When height S1 from the coordinates A1 to the cutting edge of the veneer knife 15 changes, the broken-line spiral representing the path along which the cutting edge of the veneer knife 15 moves on the cross section of the log 1 changes during the peeling from when the height S1 remains the same. This in turn changes the direction of the tangent to spiral L from the cutting edge of the veneer knife 15, so that clearance angle theta 1 is changed to clearance angle theta 3 as shown in FIG. 5B instead of theta 2 with the known method as shown in FIG. 2.

This means that if the change of height S1 to height S2 is appropriately set in advance, the direction of the tangent and thus the clearance angle can also be changed as desired in the process of peeling. According to this embodiment, this change is effected by controlling the positions of the pressure rollers 21 and 31 based on input signals, such as displacement set value H.

Figure 9:
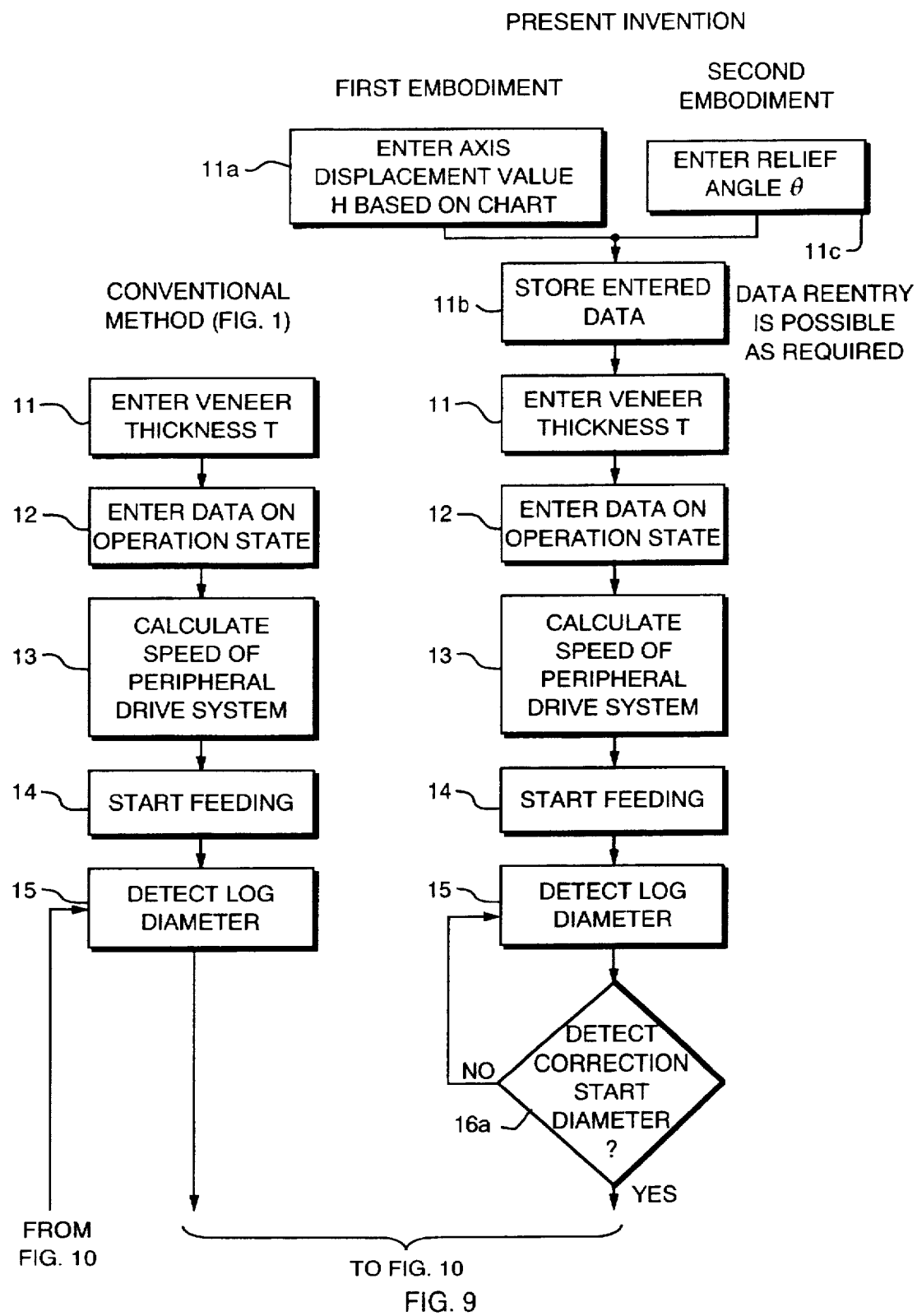
FIG. 9 is flowcharts showing the first half of a clearance angle embodiments, and a known feed method.
Figure 10:
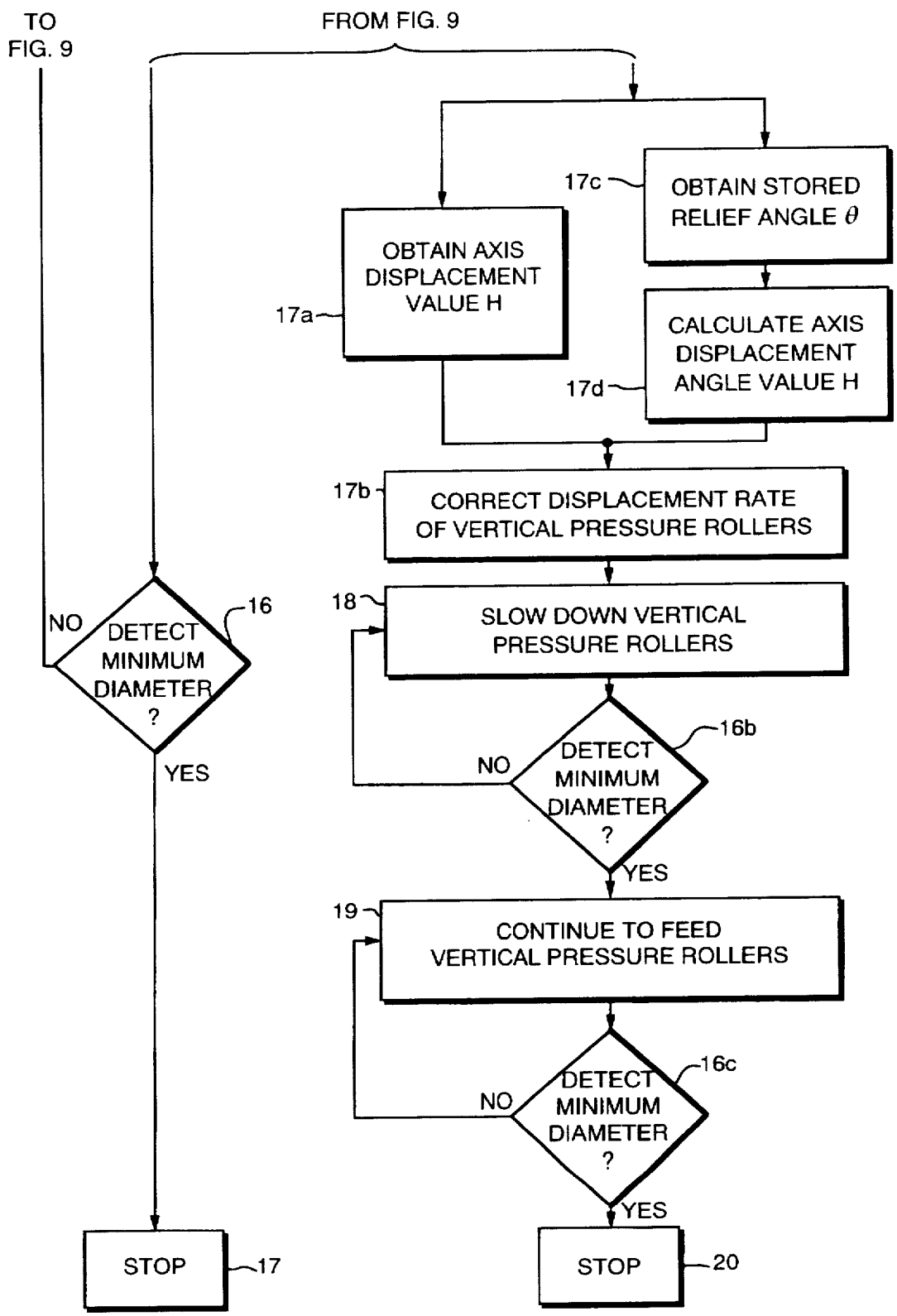
FIG. 10 is the latter half of the flowcharts of FIG. 9.

The operation of the veneer lathe according to the program executed by the control unit 41 is explained in comparison with a known method with specific reference to flowcharts of FIGS. 9 and 10.

Prior to the start of the veneer lathe, displacement set value H is entered at step 11a, which is stored in memory at step 11b. Then, veneer thickness T to be peeled from the log is entered at step 11. The output signals from the position detector 18c of the tool post 20 and rotational angle detector 21b are sent to the control unit 41 as information representative of the operation state of the lathe at step 12. Upon receiving these signals, the control unit 41 calculates the displacement rate of the peripheral drive system at step 13 (the displacement rate at this step is synonymous with speed). The program then proceeds to step 14, at which the feeding of the peripheral drive system starts.

During veneer peeling, the diameter of the log 1 is measured at step 15. The operation so far according to this program is identical to that of the known method by which the three sets of rollers 3, 21, and 31 are fed at the same displacement rate (speed) until the diameter is detected at which the rotational axis positioning control is started at step 16a. The program proceeds to step 17a, at which displacement set value H either originally entered at step 11b or reentered at a suitable, later time is sent to the microcomputer, and based on the value, the displacement rate of the vertical pressure rollers 31 is corrected at step 17b. At step 18, the vertical pressure rollers 31 begin to be fed at a slower rate than the other two sets of rollers 3 and 21 according to the correction. This feeding at the slower rate continues until the minimum peelable diameter of the log 15 is detected at step 16b.

The following is an explanation of displacement set value H regarding the position of the rotational axis A of the log 1, which is entered as a signal into the control unit 41.

The cutting edge of the veneer knife 15 is positioned 1 mm below the rotational axis A of the log 1 in this embodiment. This position is not adjusted according to the thickness of the veneer 4; thus the clearance angle varies according to the veneer thickness even if the diameter of the log 1 is the same. Since the relationship between the log diameter and clearance angle thus varies according to the veneer thickness, each time the veneer thickness is changed, a chart or a table needs to be referred to in order to determine a suitable displacement set value H to be entered into the control unit 41.

Figure 11:
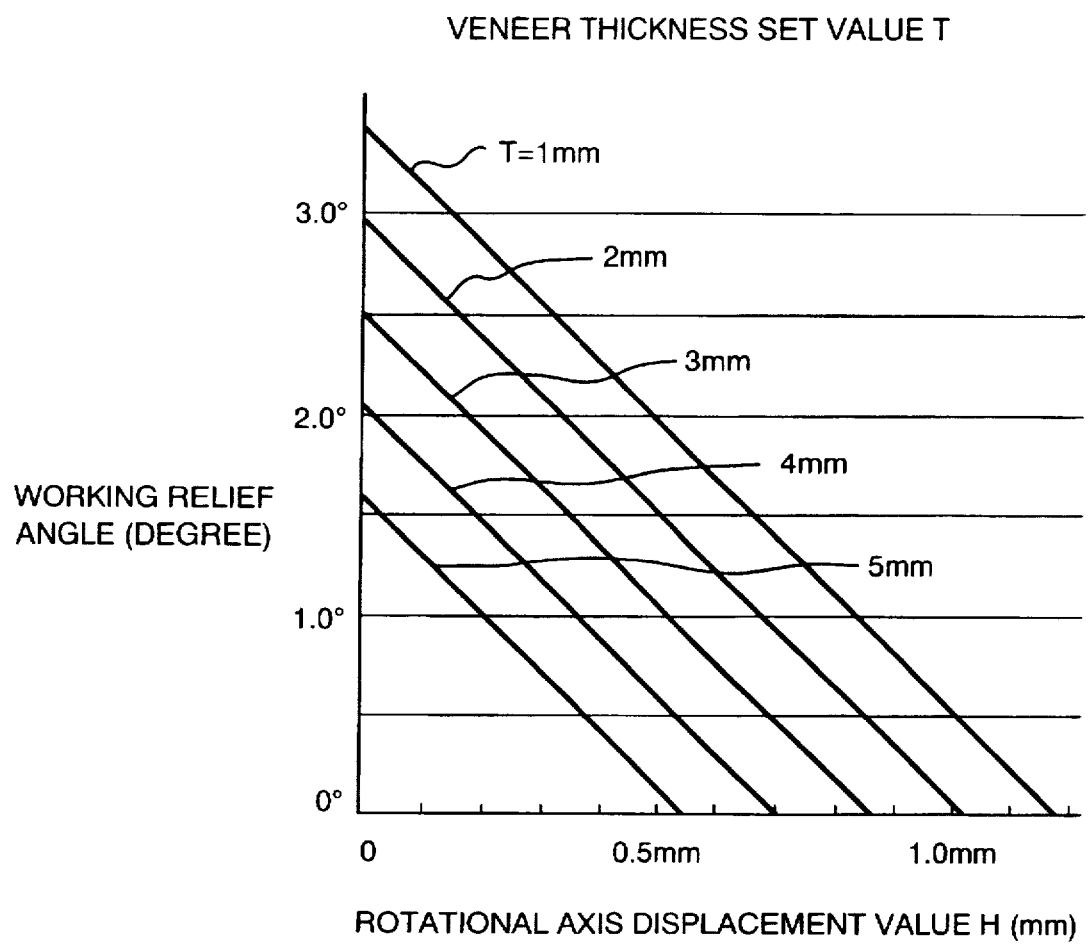
FIG. 11 is a chart showing displacement set value H plotted against the clearance angle at a minimum peelable diameter for different veneer thicknesses.

FIG. 11 is a chart showing displacement set value H plotted against the clearance angle at the minimum peelable diameter for different veneer thicknesses. It is understood from this chart that if the thickness is set to 2 mm and if the displacement set value is set to 0 mm (the same as with the known method), the clearance angle increases up to approximately 3 degrees at the minimum peelable diameters (the same result as by the known method).

Figure 3:
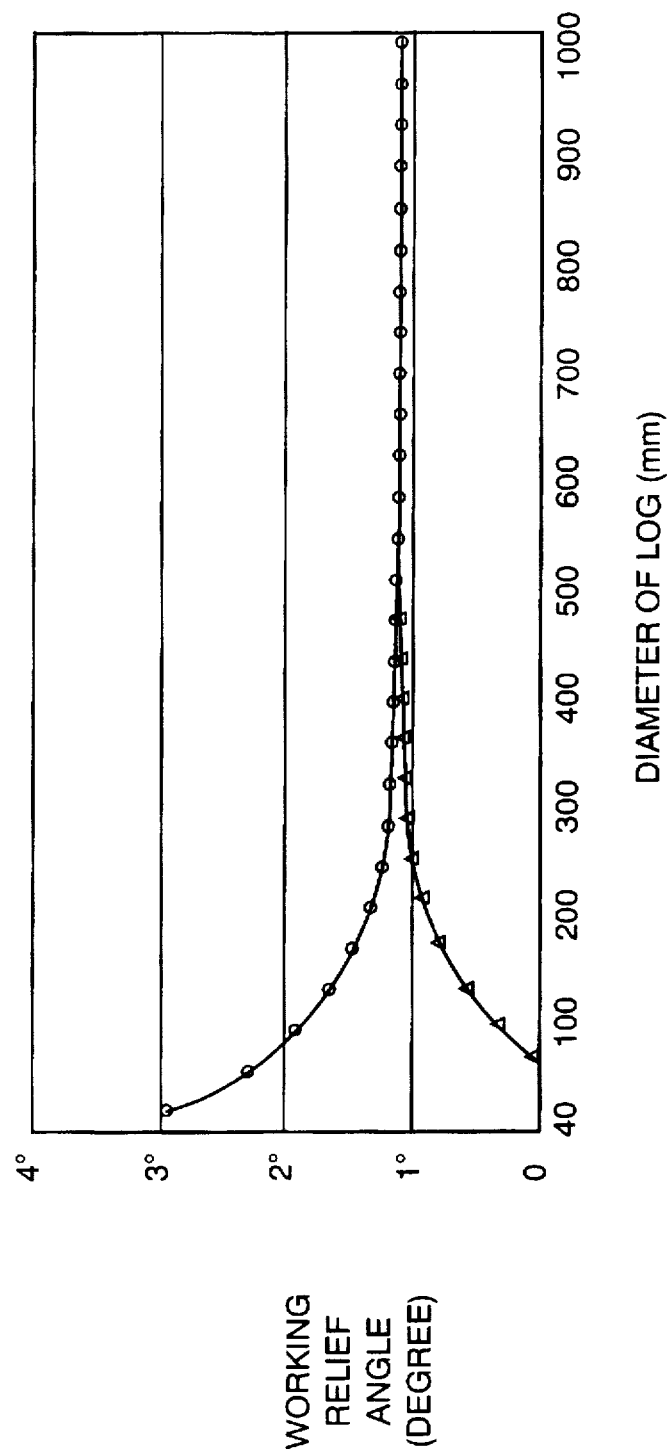
FIG. 3 is a graph showing typical clearance angle curves over the diameter reduction of the log.
Figure 4:
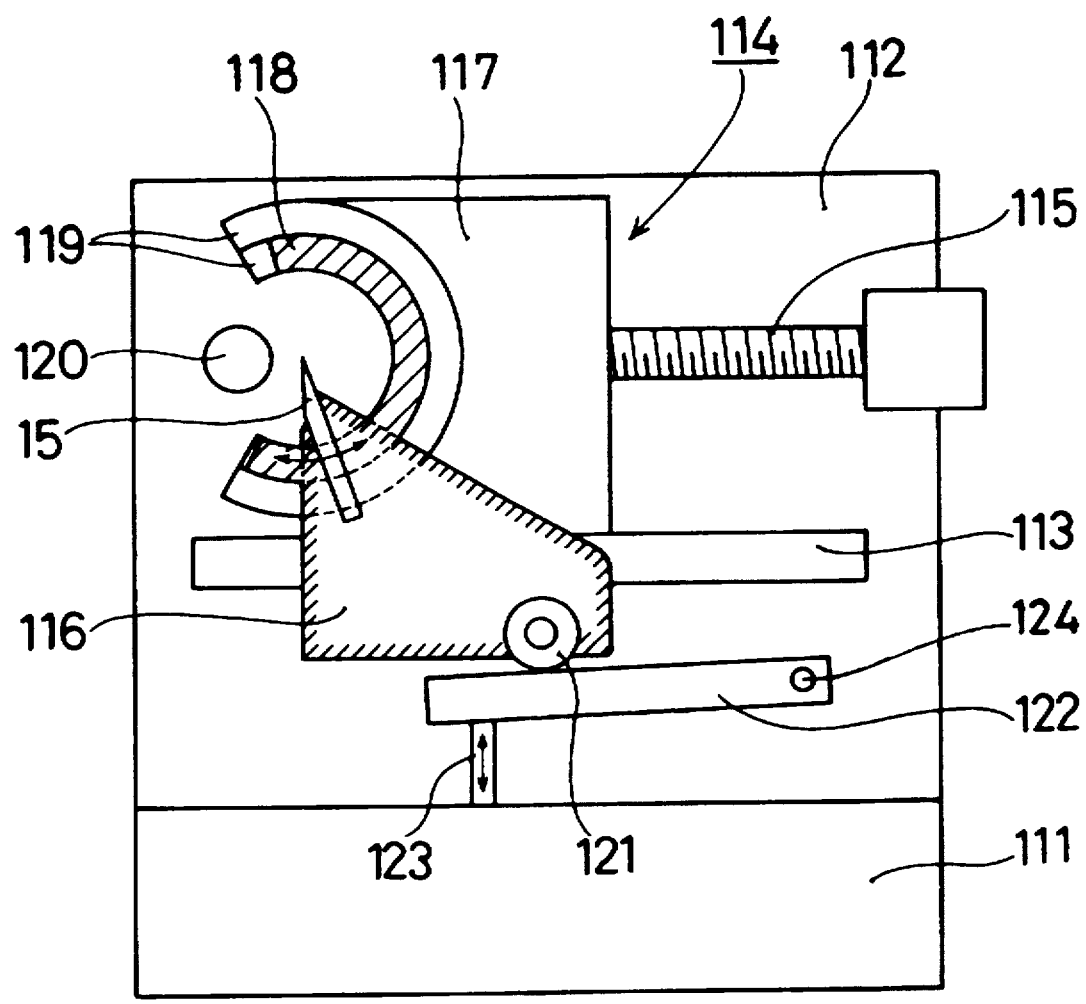
FIG. 4 is a central sectional side view illustrating a known cutting angle adjusting apparatus.

From the chart of FIG. 3, it is understood that if the clearance angle can be kept at 1 degree toward the end of veneer peeling until the minimum peelable diameter is reached, the clearance angle remains approximately the same over the entire diameter range. For that purpose, that is, to maintain the clearance angle at 1 degree, it can be readily understood by referring to FIG. 11 that displacement set value H should be set to approximately 0.7 mm.

The control of the vertical pressure rollers 31 based on displacement set value H will now be explained hereinafter by an example.

In this example, the control unit 41 calculates the feed rate of the vertical pressure rollers 31 at which the rotational axis A of the log 1 is lowered by 1 mm between the time the diameter of the log reaches 140 mm, where the rotational axis positioning control is set to start, and the time the diameter reaches a minimum peelable diameter of 40 mm, where the rotational axis positioning control is set to terminate.

More specifically, the feed rate is calculated to move the rotational axis A vertically downward at a rate of 0.01 mm per 1-mm reduction of the log diameter or the vertical displacement of 1 mm over the 100-mm control range. Then, the driving signal transmitter 41b transmits the signal representing the calculation to the feeding motor 35b. In this case, the feed rate of the vertical pressure rollers 31 is 0.99 mm per 1-mm reduction of the log diameter while the feed rates of the feed mechanism 18 and the horizontal pressure rollers 21 are both 1 mm per 1-mm reduction of the log diameter.

In other words, the vertical pressure rollers 31 are moved toward the rotational axis of the log 1 at a slower rate than that of the feed mechanism 18 and the horizontal pressure rollers 21 in order to move down the center of the rotation A of the log 1, whereas by the conventional method, the feed mechanism 18, the horizontal pressure rollers 21, and the vertical pressure rollers 31 are all fed at the same rate to maintain the rotational axis A in the same position.

The following is an explanation of the control of the horizontal pressure rollers 21.

As described above, since the rotational axis A continues to be lowered during veneer peeling by feeding the vertical pressure rollers 31 at a slower rate, there would occur a slight gap between the horizontal pressure rollers 21 and the periphery of the log 1 without some effective measure. To avoid this problem, the feed rate of the horizontal pressure rollers 21 is corrected by the control unit 41 for such gap so that the rollers 21 are moved at a corrected, higher feed rate than by the conventional method. When displacement set value H is large, this correction is essential because the gap would become significantly wide as the log 1 is peeled close to its minimum peelable diameter. On the other hand, when displacement set value H is small, the gap may be negligible due to the elastic deformation of the log 1 caused by the horizontal pressure rollers 21. In that case, such correction can be dispensed with.

When the thickness of the veneer 4 to be peeled is 4 mm, for example, veneer thickness set value T is also set to 4 mm.

As explained before, the cutting edge of the veneer knife 15 is permanently positioned 1 mm below the initial position of the rotational axis A of the log 1 (S1) in this embodiment. With veneer thickness set value T set to 4 mm, the cutting edge reference position is approximately 0.6 mm (given by the equation of t/2 pi as also mentioned before). Since the actual cutting edge of the veneer knife 15 is below the current cutting edge reference position, the clearance angle would increase as the veneer peeling proceeds with the conventional method.

In this embodiment, it is understood by referring to the chart of FIG. 11 if displacement set value H is set to 0.36 mm, the clearance angle can be maintained throughout the peeling operation.

After veneer thickness set value T is set to 4 mm, for example, the rollers 3, 21 and 31 are control to feed as explained above.

The chart of FIG. 11 is often referred to when determining displacement set value H to be entered into the control unit 41. In this determination, however, other factors may be considered than just maintaining the clearance angle at 1 degree to obtain higher quality veneers; it may be preferable not to strictly follow the chart, but to decide what the final clearance angle veneer and/or the log, and enter a suitable displacement set value H. Moreover, displacement set value H may be changed by reentering a new value at any desired time even during veneer peeling.

More specifically, displacement set value H should be determined on the basis of the quality of the veneer surface; if roughened surface is found due to vibration or chattering of the cutting edge of the veneer knife 15, such vibration is possibly ascribed to the cutting edge cutting too deeply into the log 1. To prevent this, the rotational axis A should be moved further downward to additionally reduce the clearance angle. This increases the contact area between the relief of the veneer knife 15 and the log 1, so that the relief of the veneer knife 15 is more strongly pressed against the log 1, thereby eliminating the vibration of the veneer knife 15.

An additional advantage of the relief more strongly pressed against the log 1 in this way is that the log 1 is more securely held between the veneer knife 15 and the pressure rollers 21, so that peeling becomes more stable free of undesirable vertical shifting of the log 1.

For example, if the final clearance angle is to become 0.5 degree instead of the standard value of 1.0 degree, it is known by referring to the chart that displacement set value H should be approximately 0.55 mm.

Conversely, when the log is very hard, veneer may not be peeled properly. This may occur because the contact area between the relief of the veneer knife 15 and the log 1 is too large for the cutting edge to incise the log 1 easily. In this case, displacement set value H should be adjusted so as not to position the rotational axis A too low, thereby preventing the clearance angle.

When thickness t of the veneer 4 exceeds 2 pi mm (approximately 6.3 mm), the cutting edge of the veneer knife 15 is above the reference cutting edge position, so that the clearance angle decreases as the peeling proceeds. Since this could be desirable from the viewpoint of improving the quality of the veneer 4, no rotational axis positioning control may be required. However, when the log 1 is too hard for the veneer knife 15 to cut smoothly as described above, control should be exercised to appropriately lower the rotational axis A during the veneer peeling.

Upon receiving displacement set value H, the control unit 41 calculates the displacement of the rotational axis A required for controlling the clearance angle. On the basis of this calculation, the rotational axis A is moved vertically, with the veneer peeling performed in a much higher degree of freedom than the conventional method. Also, the log 1 can be peeled to a smaller diameter than by the conventional method without roughening or otherwise damaging the surface of the veneer 4.

Rather than entering rotational axis set value H (which can be changed at any suitable time if so desired), it is also possible in this embodiment to select an automatic control in which clearance angle theta can be maintained substantially at the same level during peeling based on the entered veneer thickness set value T.

Under the automatic control, the control unit 41a calculates the reference cutting edge position (t/2 pi) based on veneer thickness set value T. The control unit 41 also calculates displacement set value H, based on which the rotational axis positioning control is performed. Even during the automatic control, the rotational axis set value H can be changed overriding the automatic control underway.

This embodiment includes the following additional process when the log 1 is being peeled down to the minimum peelable diameter that is not included in the conventional method.

As explained above, when peripheral drive rollers and a veneer knife move on two horizontal planes slightly part from each other under a spindleless condition, the torque required for driving the log tends to become insufficient because the spikes are insufficiently engaged with the peripheral surface of the log as the diameter of the log becomes smaller. In this embodiment, therefore, the pressure member 9 prevents the spikes 3b from being insufficiently engaged as shown in FIG. 6.

Even with such a construction, when the peripheral pressure rollers approaches the minimum peelable diameter, it has been unavoidable for the spikes to be insufficiently engaged with the peripheral surface of the log in the conventional lathe. This causes the freshly peeled portion of the veneer not to be properly moved off the cutting edge of the veneer knife, thereby reducing the working efficiency of the veneer lathe.

In this embodiment, the feeding of the tool post 20 and the pressure rollers 21 and 31 are not stopped to complete peeling when the minimum peelable diameter is reached as in the conventional technique. Instead, even after the conventional minimum peelable diameter is detected and the tool post 20 is no longer fed at step 16b, the vertical pressure rollers 31 continue to be fed at step 19. This additional feeding of the vertical pressure rollers 31 is continued until the rotational axis of the log 1 is raised by any suitable distance (normally between 2 and 3 mm), finally completing the veneer peeling at step 20.

This additional feeding of the vertical pressure rollers 31 allows the rotational axis A of the log 1 to move upward instead of downward, so that the engagement between the periphery of the log 1 and the spikes 3b may become more secure. This in turn allows the veneer 4 to be moved off the cutting edge of the veneer knife 1 more easily. The distance by which the rotational axis of the log 1 is moved upward may be designated by entering a value, which can be changed at any suitable time.

While the pivotal arms 5 allows the spikes 3b to be pressed against, and engageable with, the periphery of the log 1, the structure such as in the third embodiment may be employed, in which peripheral drive rollers with spikes are aligned with a pressure member so that the peripheral drive rollers are fed in a straight line.

As is clear from the foregoing explanation, the spindleless veneer lathe of this embodiment can freely control the clearance angle axis A of the log 1 to any given position. In addition, the log 1 can be peeled down to a smaller diameter due to the small diameter of the vertical pressure rollers 31, resulting in increased production yields.

Embodiment 2

Figure 7:
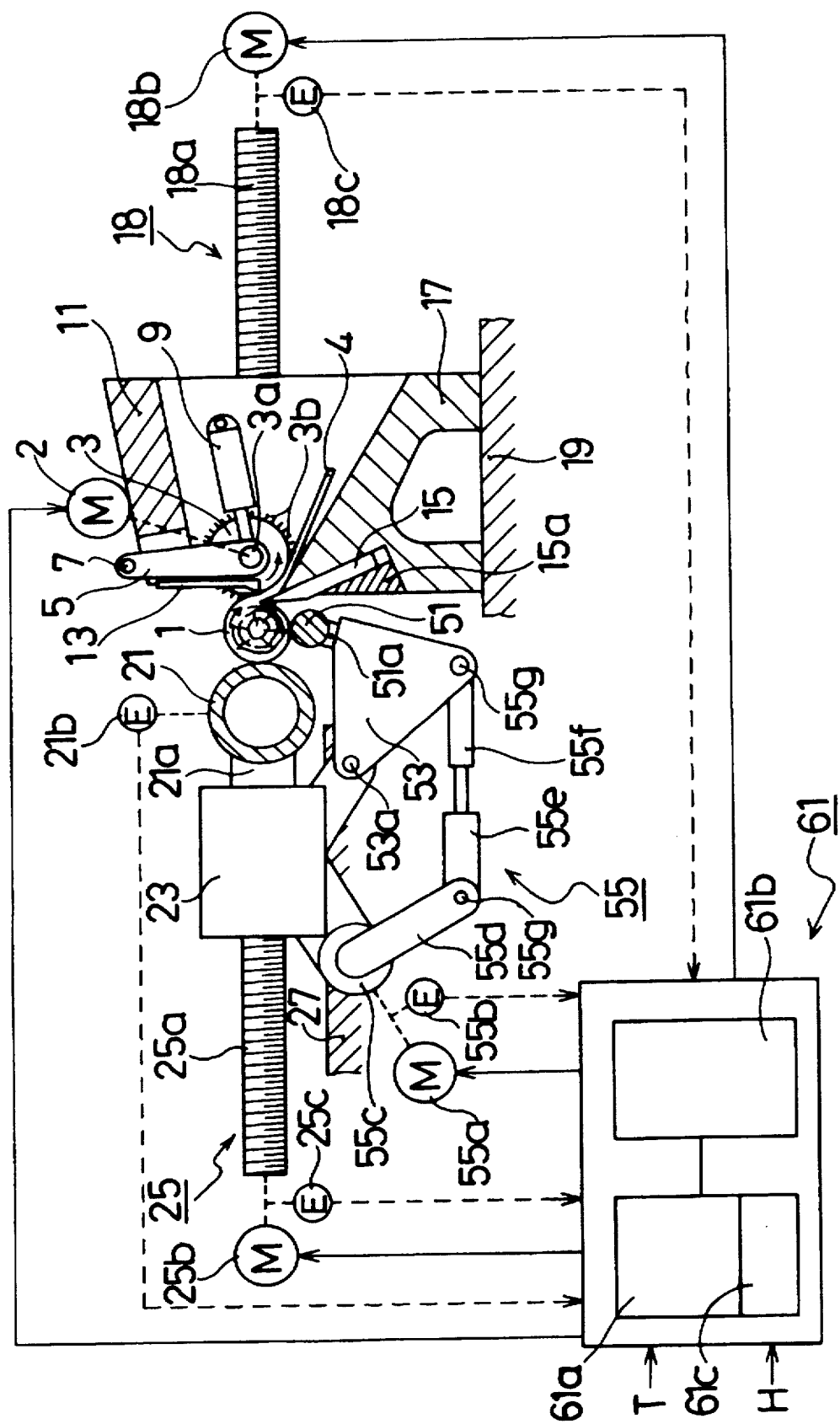
FIG. 7 is a side view schematically illustrating a spindleless veneer lathe to which a relief angle control method is applied as a second embodiment.

FIG. 7 is a side view schematically illustrating an alternate spindleless veneer lathe to which the present invention is applied as a second embodiment. Parts similar to those previously described with reference to FIG. 6 are denoted by the same reference numerals.

Reference numeral 51 denotes a plurality of freely rotatable, sectional vertical pressure rollers provided on a support frame 53 via bearing boxes 51a. The rotational axis of the vertical pressure rollers 51 lies approximately vertically below the rotational axis A of the log 1. The pressure rollers 51 are brought into contact with the peripheral surface of the log 1 to prevent the log 1 from being bent vertically.

The support frame 53 is rotatably connected to the support frame 23 of the horizontal pressure rollers 23 via a pivotal shaft 53a. The support frame 53, also connected to a lifting gear 55, is able to move approximately vertically toward and away from the rotational axis of the log 1.

The lifting gear 55 includes a lifting gear motor 55a, such as a servomotor, a position detector 55b, such as a rotary encoder, a final reduction gear 55c for receiving driving force from the lifting gear motor 55a, a rotatable arm 55d connected to the final reduction gear 55c, a buffer 55e, a coupler 55f, and a support shaft 55g.

The purpose of the buffer 55e, which includes a compression spring, is to absorb any overload to prevent resultant damage of the lifting gear 55 or undesirable displacements of the vertical pressure rollers 51 caused by, for example, wood splinters stuck between the log 1 and the vertical pressure rollers 51.

Denoted by a reference numeral 61 is a control unit for controlling the overall operation of the motors 2, 18b, 25b, and 55a. The control unit 61 comprises a controller 61a for performing operations with an installed program on various input signals received from the respective detectors 18c, 21b, 25c, and 55b, veneer thickness set value T, and a relief angle set value alpha. The control unit 61 also includes a driving signal transmitter 61b for transmitting output signal received from the controller 61a to the motors 2, 18b, 25b, and 55a to control the operation thereof.

Each of the motors 2, 18b, 25b, and 55a may be controlled independently during preparation before or after veneer peeling by means of manual or semiautomatic operation; however, a computer program is stored in the control unit 61 for controlling the operation of all these motors 2, 18b, 25b, and 55a in a conjunctive manner during veneer peeling.

The following is explanation of relief angle set value alpha and the difference between the rotational axis positioning control of this embodiment and that of the first embodiment.

In the rotational axis positioning control of the first embodiment, displacement set value H is entered into the control unit 41; in this embodiment, however, the clearance angle alpha to be maintained during peeling is directly entered rather than displacement set value H. Then, the controller 61a calculates the displacement set value for maintaining the desired clearance angle alpha based on the entry and veneer thickness set value T.

The latter method is the easier and simpler of the two since a desired clearance angle is directly entered into the control unit 61. This eliminates the necessity for such a reference chart as the one in FIG. 11, which shows the relationship between displacement set value H and the clearance angle.

The veneer lathe is also provided with an indicator (not shown) for showing the currently designated clearance angle for operator's confirmation during veneer peeling. Also, clearance angle alpha can be changed at a suitable time during veneer peeling.

Having described the difference between the two methods, the present method is also applicable to the apparatus of the first embodiment.

As is clear from the foregoing explanation, the spindleless veneer lathe of this embodiment can freely control the working-relief angle of the veneer knife 15 by shifting the rotational axis A of the log 1 to a given position in order to control the clearance angle, thus producing high quality peeled veneers. In addition, the log 1 can be peeled down to a smaller diameter due to the small diameter of the vertical pressure rollers, resulting in increased production yields.

In this embodiment, the vertical pressure rollers 51 and the lifting gear 55 are designed to move horizontally together with the horizontal pressure rollers 21. By moving back the rollers 21, therefore, large, unobstructed space can be made between the veneer knife 15 and the rollers 21, ensuring safety and ease for various types of work, such as removing a peeled log core and maintenance on the veneer knife 15.

Embodiment 3

Figure 8:
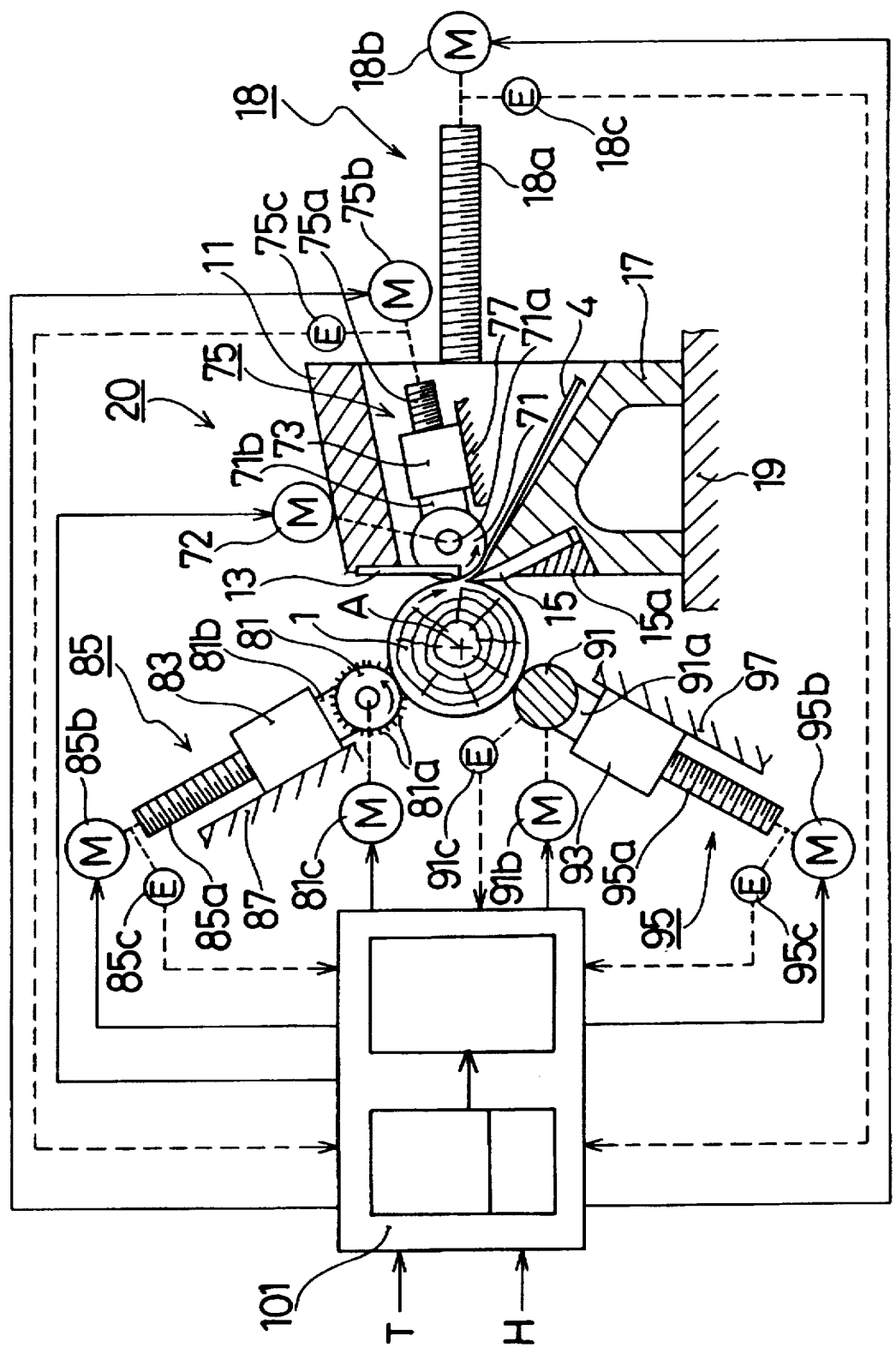
FIG. 8 is a side view schematically illustrating a spindleless veneer lathe to which a relief angle control method is applied as a third embodiment.

FIG. 8 is a side view schematically illustrating another spindleless veneer lathe to which the present invention is applied as a third embodiment. Parts similar to those previously described with reference FIG. 6 are denoted by the same reference numerals.

Each of the previous two embodiments is provided with three feeding mechanisms for feeding respective three sets of rollers and a single peripheral drive systems for driving a single set of drive rollers. The veneer lathe of this embodiment, however, is provided with three peripheral drive systems for driving respective three sets of rollers as well as three feeding mechanisms for feeding the three sets of rollers.

In each of the first and second embodiments, the veneer lathe, provided with a horizontally movable peripheral drive rollers movable horizontally, horizontal pressure rollers also movable horizontally, and vertical pressure rollers for movable vertically, performs the rotational axis positioning control using the vertical pressure rollers. In this embodiment, the veneer lathe includes a set of disk rollers 71 movable in a horizontal direction, upper pressure rollers 81, and lower pressure rollers 91, both movable in oblique directions. Thus constructed, the veneer lathe performs the rotational axis positioning control with the upper and lower pressure rollers 81 and 91.

The disk rollers 71 constitutes an auxiliary peripheral driving system composed of a plurality of freely rotatable, thin rollers disposed at axially spaced intervals on a common drive shaft 71a. Even without spikes on their peripheral surfaces unlike the above-mentioned peripheral drive rollers, the disk rollers 71 can provide additional torque required for smoothly rotating the log 1 from its periphery and prevents the peeled veneer 4 from being stuck at the cutting edge to smoothly transfer the peeled veneer 4 downstream.

The drive shaft 71a is connected to a support frame 73 via a bearing box 71a for receiving additional torque required for smoothly rotating the log 1 from its periphery from a drive motor 72, such as a servomotor, mounted on the support block 11. The support frame 73 is mounted on the slide surface 77 and is freely reciprocated by a disk roller feed mechanism 75.

The above-explained construction allows the disk rollers 71 to closely follow, and remains in engagement with, the log 1 as its diameter decreases during veneer peeling, supplying some of the torque required for driving the log 1 from its periphery.

The disk roller feed mechanism 75 includes a feed screws 75a, such as a ball screws, connected to the support frame 73 via a bearing box (not shown), a disk roller feed motor 75b, such as a servomotor, a disk roller position detector 75c, such as an rotary encoder. As explained below in detail, the operation of the disk roller feed motor 75b is so controlled by a control unit 101 that the disk rollers 71 closely follow, and remain in engagement with, the log 1 as its diameter decreases during veneer peeling.

The upper pressure rollers 81 are a plurality of freely rotatable, sectional pressure rollers with numerous spikes 81a thereon provided on a support frame 83 via a bearing box 81b, and are located above the rotational axis A of the log 1 approximately diametrically opposite of the cutting edge of the veneer knife 15. The pressure rollers 81, engageable with the peripheral surface of the log 1, receive driving force from a drive motor 81c, such as a servomotor, and provide additional torque required for rotating the log 1 from its periphery. The rollers 81 also prevent the log 1 from being bent by the veneer knife 15. The support frame 83 is mounted on the slide surface 87 and allowed to reciprocate in an oblique direction by an upper pressure roller feed mechanism 85.

The upper pressure roller feed mechanism 85 includes feed screws 85a, such as ball screws, connected to the support frame 83 via a bearing box (not shown), an upper pressure roller feed motor 85b, such as a servomotor, an upper pressure roller position detector 85c, such as an rotary encoder. As explained below in detail, the operation of the upper pressure roller feed motor 85b is so controlled by the control unit 101 that the upper pressure rollers 81 closely follow, and remain in engagement with, the log 1 as its diameter decreases during veneer peeling. Also, the upper pressure roller feed mechanism 85 can reciprocate the upper pressure rollers 81 at a suitable rapid traverse rate.

17

The lower pressure rollers 91 are a plurality of freely rotatable, sectional pressure rollers provided on a support frame 93 via a bearing box 91a. The lower pressure rollers 91 are located directly under the upper pressure rollers 81 below the rotational axis of the log 1. Engageable with the periphery of the log 1, the lower pressure rollers 91 receive driving force from a drive motor 91b, such as a servomotor, and supply additional torque required for rotating the log 1. The rollers 91 also prevent the log 1 from bowing during peeling.

Reference numeral 91c denotes a rotational angle detector, such as a rotary encoder, for measuring rotational angles of the log 1 and sending data representative of the measurements to the control unit 101 so that the tool post 20 is fed corresponding to the rotational speed of the log 1. A support frame 93 is mounted on a slide surface 97 and allowed to reciprocate along a predetermined path in an oblique direction by a lower pressure roller feed mechanism 95.

The feed mechanism 95 includes a plurality of rotatable lead screws 95a, such as ball threads, a lead screw feeding motor 95b, such as a servomotor, a position detector 95c, such as a rotary encoder. One end of each lead screw 95a is connected to the support frame 93 via a bearing box (not shown). The feeding motor 95b operates under the control of the control unit 101 to feed the lead screws 95a at a predetermined rate so that the pressure rollers 91 can stay engaged with the peripheral surface of the log 1 as the diameter of the log 1 decreases in the process of peeling. The feed mechanism 95 can also cause the pressure rollers 91 to reciprocate at a desired rapid traverse rate.

Denoted by a reference numeral 101 is a control unit for controlling the overall operation of the motors 72, 75b 18b, 85b, and 95b in a similar manner to the control units 41 and 61 in the first and second embodiments, respectively. The control unit 101 comprises a controller 101c for performing operations with an installed program on various input signals received from the respective detectors, a veneer thickness set value, and a displacement set value, a driving signal transmitter 61b for transmitting output signals from the controller 61b to the motors 72, 75b 18b, 85b, and 95b to control the operation thereof, and a compensator 101c for correcting the operation of the motors 72, 75b, 18b, 85b, and 95b based on the received input signals, a veneer thickness set value, and a displacement set value.

The rotational axis positioning control according to this embodiment is identical to that of the second embodiment. Thus, the value representing a desired clearance angle alpha, rather than a displacement set value, is directly entered into the controller 101, which calculates a displacement set value based on the entered value and veneer thickness set value T. Subsequently, the rotational axis of the log 1 is automatically controlled based on the calculated displacement set value H to carry out peeling while maintaining the entered clearance angle alpha.

Since the motors 75b, 85b, and 95b for the rollers 71, 81, and 91 are servomotors, the feed rates of the rollers 71, 81, and 91 are not necessarily constant, but variable during veneer peeling.

As an modification of the structure of this embodiment, the disk roller feed mechanism 75 may be constructed similarly to the one employed in the first and second embodiment, which comprises pivotal arms and a hydraulic cylinder coupled thereto.

Although the log 1 is held and driven by the disk rollers 71, the upper pressure rollers 81, and the lower pressure

18 rollers 91 in this embodiment, some other structure is possible; for example, only one set of rollers may rotate the log 1, or a fourth set of rollers may be added to hold the log 1 more securely.

The disk rollers 71 may be replaced with any suitable device as long as such device can transmit driving force to drive the log 1. For example, the spiked peripheral drive rollers 3 of the first and second embodiments will suffice.

As the spikes 81a on the upper pressure rollers 81 are brought into incising engagement with the periphery of the log 1, there is little possibility of slippage occurring between the log 1 and the upper pressure rollers 81, with the driving force stably transmittable to the periphery of the log 1. Instead of the spikes 81a, however, the rollers 81 may be coated with material, such as rubber or abrasive paper or cloth or provided with grooves or knurls formed thereon to increase the coefficient of friction when in contact with the log 1. Alternatively, the rollers 81 may have a number of small projections which do not vary the incising depth into the log 1 with a variation in hardness of the log 11.

The positions of the rollers 81 and 91 may also be adjusted as required as long as the rotating log 1 can be securely held.

Any of the feed mechanisms 85, 95, and 8 may employ a servo-mechanism including a hydraulic cylinder instead of a servomotor as in this embodiment.

As is clear from the foregoing explanation, the spindleless veneer lathe of this embodiment can freely control the clearance angle axis of the log 1 to a designated position in order to produce high quality peeled veneers. In addition, the log 1 can be peeled down to a smaller diameter due to the small diameter of the vertical pressure rollers, resulting in increased production yields.

In this embodiments, the upper and lower pressure rollers 81 and 91 are designed to move in oblique directions, rather than vertically or horizontally, toward and away from the rotational axis A of the log 1. Thus, by withdrawing the rollers 81 and 91, large, unobstructed space can be obtained in front of the tool post 20 where a swing log charger may brought in to charge the veneer lathe.

Other embodiments and modifications

In each of the foregoing three embodiments, the present invention is applied to a spindleless veneer lathe for peeling veneers from a log under a centerless or spindleless condition after spindles are moved away from the log at a convenient time during veneer peeling. However, the present invention is applicable to a veneer lathe having no spindles at all as long as such a veneer lathe includes at least three sets of rollers, feed mechanisms coupled to not less than two sets for feeding thereof, and a drive mechanism coupled to not less than one set for rotatably driving thereof so that the log is held by all the rollers while peeling the log with a cutting knife. In this case, the veneer knife may be held at a desired clearance angle from the beginning of peeling if the rotational axis positioning control is programmed to start at the beginning of the peeling.

FIG. 12 is a partial side view of a veneer lathe illustrating one such alternative construction. In this veneer lathe, a knife carriage 130 having the veneer knife 15 thereon and a first roller 131 are secured to a base (not shown). Second and third rollers 132 and 133 are so provided on the base as to be movable along respective guide members (not shown) toward the first roller 131 as indicated by the respective straight arrows. As for their feed mechanisms, those used for the upper and lower pressure rollers 81 and 91 as shown in FIG. 8 are sufficient.

In operation, the second and third rollers 132 and 133 rotate the log 1 clockwise while pressing the log 1 toward the first roller 131. This allows the log 1 to be peeled by the veneer 15 while held at the position shown in FIG. 12. In order to shift the rotational axis A of the log 1 in the same manner as shown in FIGS. 5A and 5B, the feed rate of the second roller 132 is set to become greater than that of the third roller 133 as in the embodiments. In this way, the rotational axis of the log 1 can be shifted in the direction perpendicular to the plane extending between the rotational axis and the cutting edge of the veneer knife 15, that is, in the direction of the tangent to the periphery of the log 1 from the cutting edge of the veneer knife 15.

Also in the three embodiments, the diameter range within which the rotational axis positioning control is performed to maintain a desired clearance angle is from 140 mm to 40 mm to ensure an even thickness of the veneer The clearance angle would otherwise undergo a rapid change in this range. The time of the commencement and/or the termination of the controlling the clearance angle may be freely changed to meet requirements by programming the control unit. In addition, also by advance programming, the control range may be divided into several stages with different relief angle settings so that the change in angle occur in a step-by-step manners, rather than steplessly.

Although each set of the rollers are moved on a plane on which the rotational axis A lies, the directions or the heights of movement of the rollers may be changed. For example, the horizontal pressure rollers 21 of the first embodiment may be moved on a horizontal plane slightly above the rotational axis A.

The pair of spindles, moved away from the log before the beginning of the rotational axis positioning control, may be replaced with double-spindles, each of which normally includes a larger, 200-mm diameter spindle and a smaller, 50-mm diameter spindle in order to increase the support on the log.

The cutting edge of the veneer knife 15 is located on the horizontal plane on which the rotational axes of the feed screws 18 lie in the each of the foregoing embodiments. However, the present invention is also applicable to veneer lathes having knives in different positions; for example, the veneer knife may be held above the log to be peeled with its cutting edge located approximately directly above the rotational axis of the log.

In the first and second embodiments, each of the feed mechanism, the shifting mechanism, and the lifting mechanism is provided with a plurality of feed or lead screws. However, if the lathe peels veneers from a relatively short log, a single feed or lead screw will suffice for each mechanism. Likewise, in the third embodiment, each of the feed mechanism and the upper and lower pressure roller feed mechanisms includes a plurality of feed or lead screws. A single feed or lead screw will also be sufficient depending on the application. Also in the third embodiment, one bearing box 51a may be sufficient depending on the length of logs to be peeled.

While the present invention has been described and illustrated specifically with reference to the above preferred embodiments, it is to be understood that the present invention can be practiced in various changes an modifications without departing from the scope or spirit of essential characteristics thereof.

What is claimed is:

1. A method of controlling a clearance angle of a veneer knife in a veneer lathe under a spindleless condition, the veneer lathe being used for peeling veneers from a log comprising a veneer knife for peeling veneers, not less than three rollers, feed mechanisms coupled to not less than two of the rollers for feeding thereof, and not less than one drive system coupled to not less than one of the rollers for rotatably feeding thereof, wherein the roller to which one of the drive systems is coupled supplies all the driving force required for rotating the log while each roller to which one of the feed mechanisms is coupled is fed to peel the log with the veneer knife while the log is held by all the rollers, the method comprising the steps of:

setting a shifting amount in a correcting unit of the lathe based on a reduction in the diameter of the log from a predetermined first diameter to a predetermined second diameter; and automatically shifting the rotational axis of the log during veneer peeling in the direction perpendicular to the plane extending between the rotational axis of the log and the cutting edge of the veneer knife by the shifting amount, thereby controlling the clearance angle of the veneer knife during the veneer peeling.

2. A method according to claim 1 wherein the shifting amount based on the reduction in the diameter of the log is set at least before the cutting edge of the veneer knife reaches the predetermined first diameter.

3. A method according to claim 1, wherein the first diameter of the log is approximately 140 mm and the second diameter of the log is approximately 40 mm.

4. A method according to claim 1, wherein the rotational axis of the log is automatically shifted during veneer peeling in the direction perpendicular to the plane extending between the rotational axis of the log and the cutting edge of the veneer knife by changing the feed rates of all the rollers except those fed by the feed mechanism in the direction along the plane extending between the rotational axis of the log and the cutting edge of the veneer knife, thereby controlling the clearance angle of the veneer knife during veneer peeling.

5. A method according to claim 1 wherein the rollers comprise a peripheral drive roller provided above the veneer knife, a horizontal pressure roller movable in a horizontal direction, and a vertical pressure roller movable in a vertical direction, the clearance angle of the veneer knife being controlled during veneer peeling by feeding the vertical pressure roller.

6. A method according to claim 5, wherein each roller is divided into cylindrical sections disposed along the axis thereof.

7. A method according to claim 1, wherein the shifting amount is so set that the clearance angle of the veneer knife is maintained at approximately the same degree.

8. A method according to claim 1, wherein the shifting amount is corrected after the setting so as to change the clearance angle of the veneer knife.

9. A method according to claim 8, wherein the correction of the shifting amount is made before a minimum peelable diameter of the log is reached when the veneer peeling is being completed such that the rotational axis of the log is shifted in the direction opposite to the previous shifting direction so as to change the clearance angle of the veneer knife.

10. A method according to claim 1 wherein the shifting amount is set according to the thickness of the veneer to be peeled.

11. A veneer lathe for peeling veneers from a log under a spindleless condition comprising not less than three rollers, feed mechanisms coupled to not less than two of the rollers for feeding thereof, not less than one drive system coupled to not less than one of the rollers for rotatably feeding thereof, and a control unit for controlling the operation of the lathe so that each of the rollers to which one of the drive systems is coupled supplies all the driving force required for rotating the log while each roller to which one of the feed mechanisms is coupled is fed to peel the log by the veneer knife while the log is held by all the rollers, the lathe further comprising:

a correcting unit for correcting the operation of the control unit so that the rotational axis of the log is automatically shifted during veneer peeling in the direction perpendicular to the plane extending between the rotational axis of the log and the cutting edge of the veneer knife by a shifting amount set based on the reduction in the diameter of the log from a predetermined first diameter to a predetermined second diameter, thereby controlling the clearance angle of the veneer knife during the veneer peeling.

12. A veneer lathe according to claim 11, wherein the rollers comprise a peripheral drive roller provided above the veneer knife, a horizontal pressure roller movable in a horizontal direction, and a vertical pressure roller movable in a vertical direction.

13. A veneer lathe according to claim 12, wherein the correction unit makes correction so as to move the vertical pressure roller in a vertical direction so as to change the clearance angle of the veneer knife.

\* \* \* \* \*